US012283745B2

(12) United States Patent
Huang et al.

(10) Patent No.: US 12,283,745 B2
(45) Date of Patent: Apr. 22, 2025

(54) TRANSPARENT COMBINATION ANTENNA SYSTEM

(71) Applicant: Meta Platforms Technologies, LLC, Menlo Park, CA (US)

(72) Inventors: Wei Huang, San Diego, CA (US); Yasuo Morimoto, Cupertino, CA (US); Jiang Zhu, Cupertino, CA (US); Boon Shiu, Palo Alto, CA (US); Diaaaldin J. M. Bisharat, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 275 days.

(21) Appl. No.: 18/169,237

(22) Filed: Feb. 15, 2023

(65) Prior Publication Data

US 2024/0072424 A1 Feb. 29, 2024

Related U.S. Application Data

(60) Provisional application No. 63/400,308, filed on Aug. 23, 2022.

(51) Int. Cl.
*H01Q 1/27* (2006.01)
*H01Q 1/12* (2006.01)
*H01Q 1/24* (2006.01)

(52) U.S. Cl.
CPC .......... *H01Q 1/273* (2013.01); *H01Q 1/1271* (2013.01); *H01Q 1/243* (2013.01)

(58) Field of Classification Search
CPC ........ H01Q 1/243; H01Q 1/38; G06T 19/006; H10K 59/00–95; G06F 2203/041–04114; G06F 3/041–047
USPC ...... 343/700 MS, 897; 359/485.05; 333/204, 333/137, 208; 252/500
See application file for complete search history.

(56) References Cited

U.S. PATENT DOCUMENTS 4,864,314 A * 9/1989 Bond ........................ H01Q 5/42 343/897
12,176,603 B2 * 12/2024 Yun .......................... H01Q 1/38
2016/0172754 A1 6/2016 Zhai
2017/0269440 A1 * 9/2017 Yoshitomi ............. G06F 3/0446
2019/0393597 A1 12/2019 Kosaka et al.

FOREIGN PATENT DOCUMENTS

CN 109755738 A 5/2019

OTHER PUBLICATIONS

European Search Report for European Patent Application No. 23188919.7 dated Jan. 24, 2024, 07 pages.

* cited by examiner

*Primary Examiner* — Monica C King
(74) *Attorney, Agent, or Firm* — Greenberg Traurig, LLP

(57) ABSTRACT

A transparent combination antenna is disclosed that provides bandwidth at both sub 6 GHz and the above 24 GHz spectra. For example, the transparent combination antenna can include a first layer of transparent conductive material, and a second layer of transparent conductive material. In some implementations, both of the first layer and the second layer can have different pitches. Additionally, in some implementations, a substrate may be positioned in between the first layer and the second layer. Various other systems are also disclosed.

20 Claims, 8 Drawing Sheets

TRANSPARENT COMBINATION ANTENNA SYSTEM

CROSS-REFERENCE TO RELATED APPLICATION

This application claims the benefit of priority under 35 U.S.C. § 119(e) of U.S. Provisional Application No. 63/400,308, filed Aug. 23, 2022, the contents of which are incorporated herein by reference in their entirety.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
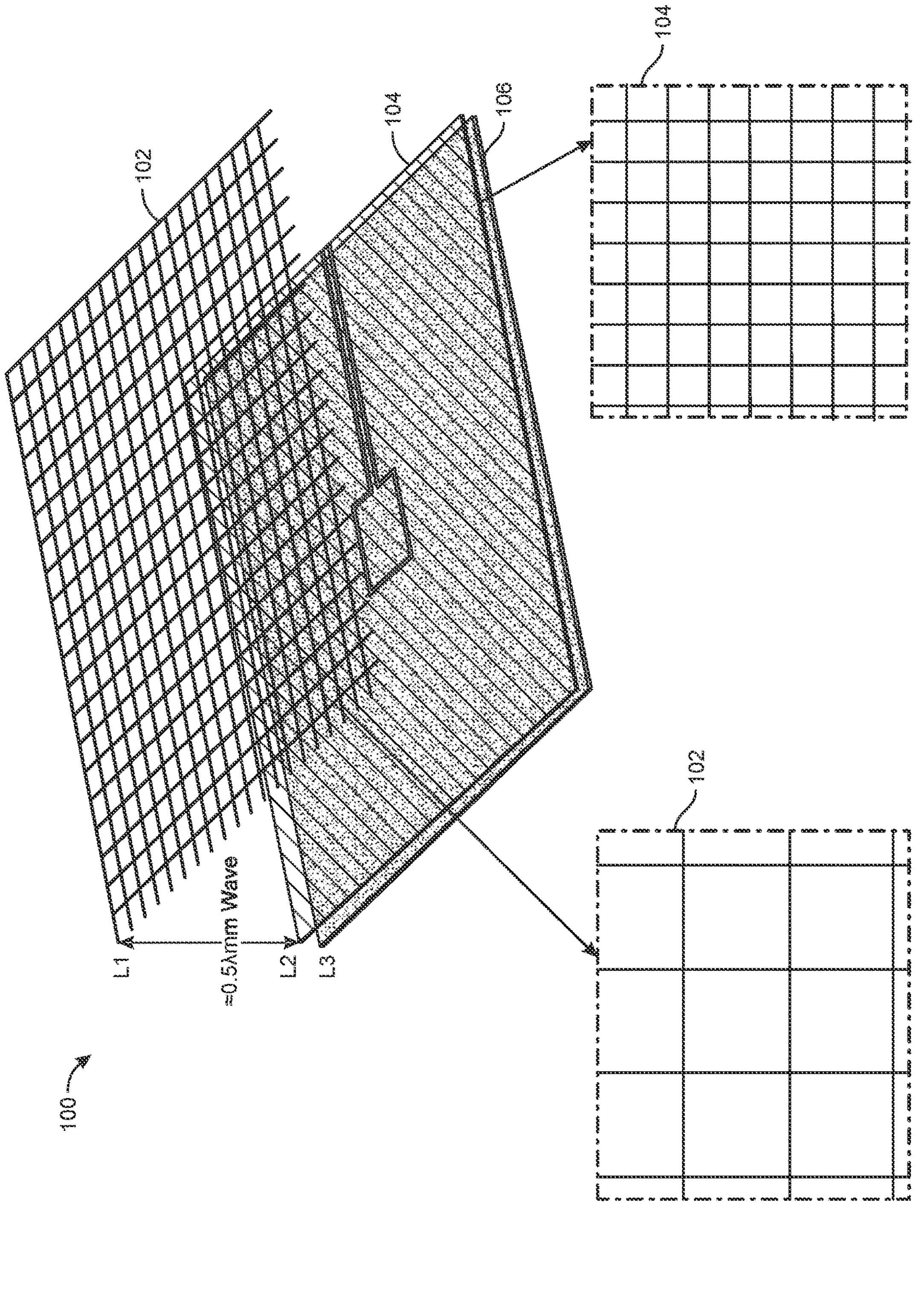
FIG. 1 illustrates a perspective view of a transparent combination antenna system.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

Various applications such as virtual reality (VR), augmented reality (AR), big data analytics, and artificial intelligence (AI) have created significant growth in the data volume of wireless networks. 5G networks have expanded the wireless spectrum to both below 6 GHz and above 24 GHz (cmWave and mmWave) and have opened a large amount of bandwidth for extreme data rate and capacity. A large unlicensed bandwidth, such as 60 GHz which also permits high data rates, also offers many advantages for short-range data transmission and radar sensing. As such, devices typically include components for 5G new radio (NR), cm/mmWave antenna, GPS, WiFi 6E, and Bluetooth, as well as other connectivity antennas. Fitting all these wireless features into compact devices such as AR devices or smart glasses may be challenging.

Highly transparent metal mesh (e.g., an improved alternative to Indium tin oxide (ITO)) offers up to 98% optical transmission and high conductivity. This transparent metal mesh can may allow antennas to be designed on glass lens areas and can reduce or eliminate the space occupied by a conventional antenna inside the AR glasses frame. Existing transparent antenna designs typically address either lower frequency applications (e.g., below 6 GHz, WiFi) or mmWave antenna applications (e.g., above 24 GHz), but not both. Other antenna solutions may support both below 6 GHz and mmWave frequency bands, but these solutions are neither optically invisible nor are they compact in size-making them unsuitable for use in connection with compact devices such as AR glasses.

The present disclosure is directed to systems and mobile electronic devices that can support both mmWave (e.g., 60 GHz radar sensing or ranging, 5G FR2) and lower frequencies (e.g., WiFi 6E, GPS, or 5G below 6 GHz communication). For example, the disclosed systems and devices can combine multiple layers of transparent conductive mesh to allow high frequency antennas (e.g., 24 GHz to 60+GHz) and lower frequency antennas (e.g., 100 MHz-10 GHz) to operate on the same substrate (e.g., on an augmented reality (AR) glass lens). The implementations described herein may include multiple layers of transparent conductive mesh to provide the respective high and low frequency antennas. In some cases, different variations in pitch may also be implemented to provide the high and low frequency antennas. As used herein, the "pitch" of a transparent conductive mesh may refer to the amount of space between mesh squares or may refer to the number of mesh squares in a given area. A higher pitch mesh, for instance, can include a greater number of more densely packed squares, while a lower pitch mesh can include fewer, more sparsely spaced squares.

In at least one implementation, for example, an optically transparent antenna system that supports both mmWave (e.g., 60 GHz radar sensing or ranging, 5G FR2) and lower frequencies (e.g., WiFi 6E, GPS, or 5G sub 6 GHz communication) can include multiple transparent antenna mesh layers that are stacked one on top of another. As the term is used herein, "optically transparent" may refer to materials, conductive layers, or elements that are fully or at least partially transparent to the human eye. The upper transparent antenna mesh layer(s) can act as either the radiator, the ground, or the signal return path for the lower frequencies' antennas (e.g., normally operating above 24 GHz). The lower transparent antenna mesh layer(s) can act as mmWave antenna radiators and/or ground (e.g., normally operating above 24 GHz). In at least one implementation, the upper transparent antenna mesh layer(s) for lower frequencies antennas can have coarser mesh (e.g., larger mesh pitch size) than the lower transparent antenna mesh layer(s) for mmWave antennas. Moreover, the mmWave radio wave can be radiated through the coarser transparent mesh layer which can be used for lower frequency antennas.

Features from any of the implementations described herein may be used in combination with one another in accordance with the general principles described herein. These and other implementations, features, and advantages will be more fully understood upon reading the following detailed description in conjunction with the accompanying drawings and claims.

The following will provide with reference to FIGS. 1-5, detailed descriptions of a transparent combination antenna system that improves wireless features over other compact transparent antennas. In some implementations, as described below, the systems herein may implement a sparser pitch transparent conductive (e.g., metal) mesh on a top layer to provide a lower frequency antenna and may implement a denser pitch conductive mesh on the bottom layer to provide a higher frequency (e.g., mmWave) antenna. The electromagnetic waves of the lower, mmWave antenna may radiate through the coarser conductive mesh of the upper layer. In other cases, the lower, dense-pitch layer may include two or more separate layers. One or more of these layers may be a grounding layer, while the other layer may be an antenna layer.

For example, as shown in FIG. 1, an optically transparent antenna 100 can include a first transparent antenna layer 102 (e.g., L1) that can act as either a sub 6 GHz antenna radiator or ground. A second transparent antenna layer 104 (e.g., L2)—or part of the second transparent antenna layer 104—can perform as a mmWave antenna radiator (e.g., a patch antenna or other type of antenna). As further shown in FIG. 1, the first transparent antenna layer 102 can have a coarser metal mesh than the second transparent antenna layer 104. As such, the mmWave radio wave of the second transparent antenna layer 104 can be radiated through the coarser first transparent antenna layer 102 (i.e., which is used for lower frequency antennas). In at least one implementation, as shown in FIG. 1, the optically transparent antenna 100 can further include a third transparent antenna layer 106 that includes a mmWave antenna ground (GND). In one or more implementations, the third transparent antenna layer 106 can be solid or mesh.

In one or more implementations, the first transparent antenna layer 102, the second transparent antenna layer 104, and the third transparent antenna layer 106 can have various pitches, widths, and thicknesses. For example, in at least one implementation, the first transparent antenna layer 102 can have a mesh pitch of 400 μm, with a mesh width of 2 μm and a mesh thickness of 2 μm. Additionally, in at least one implementation, the second transparent antenna layer 104 and the third transparent antenna layer 106 can have a mesh pitch of 50 μm, with a mesh width of 2 μm and a mesh thickness of 2 μm.

In some implementations, the distance between the lower frequency antenna (e.g., the first transparent antenna layer 102) and the higher frequency antenna (e.g., the second transparent antenna layer 104) may be close to or exactly 0.5× the wavelength of the higher frequency (bottom layer) antenna (e.g., the second transparent antenna layer 104). In such cases, many of the reflections from the upper conductive mesh layer (e.g., the first transparent antenna layer 102) may add up in phase, thereby boosting the radiation efficiency of the higher frequency (mmWave) antenna on the lower layer (e.g., the second transparent antenna layer 104).

Moreover, as mentioned above, the pitch of the bottom layer of transparent conductive material (e.g., the second transparent antenna layer 104) may be finer than the coarser pitch of the top layer of transparent conductive material (e.g., the first transparent antenna layer 102). As such, electromagnetic waves radiated by the second transparent antenna layer 104 may penetrate through the first transparent antenna layer 102 and may radiate to the outside world. Either of the first transparent antenna layer 102 and the second transparent antenna layer 104 may function as different types of antennas. For instance, either the first transparent antenna layer 102 and the second transparent antenna layer 104 may be transparent antennas such as monopole antennas, dipole antennas, loop antennas, or slot antennas.

In one or more implementations, descriptions of the transparent combination antenna system(s) herein can reference various terms. For example, as used herein the term "transparent conductive material" can refer to any material capable of conducting electricity that allows light to pass through-enough that objects behind the material can be seen. In one or more implementations, such transparent conductive material can include a transparent antenna that transmits and/or receives electronic signals. In at least one implementation a transparent antenna can be, for example, a monopole antenna, a dipole antenna, a loop antenna, or a slot antenna.

As used herein, an "antenna feed" can refer to an input connection into a transparent antenna. An antenna feed can provide one or more electronic signals to the transparent antenna. Similarly, an antenna feed can receive one or more electronic signals from the transparent antenna. As used herein, a "substrate" can be any surface on which other materials are positioned or deposited. When used in connection with one or more transparent antenna, a substrate can include a layer of glass, plastic, or other material through which electromagnetic waves may radiate. As used herein, the "pitch" of an area of mesh (e.g., metal mesh) can refer to a sum of the aperture or opening size and the diameter or gauge size of the wires that make up the mesh.

As shown in FIGS. 2A-2F, the optically transparent antenna 100 can have multiple implementations 202, 204, 206, 208, 210, 212, 218, and 220. For example, in the side-view of the implementation 202 shown in FIG. 2A, the first transparent antenna layer 102 of the optically transparent antenna 100 can include a sub 6 GHz antenna radiator, while the second transparent antenna layer 104 can include a mmWave antenna radiator and the third transparent antenna layer 106 can include a mmWave antenna ground (GND). In the side-view of the implementation 204 shown in FIG. 2B, the first transparent antenna layer 102 of the optically transparent antenna 100 can include a sub 6 GHz antenna with parts of the sub 6 GHz antenna acting as GND, while the second transparent antenna layer 104 can include a mmWave antenna radiator and the third transparent antenna layer 106 can include a mmWave antenna GND. With of parts of the sub 6 GHz antenna in the first transparent antenna layer 102 acting as GND, the implementation 204 can include two additional points of radiation at the grounding points. The multiple points of radiation illustrated in the implementation 204 may lead to improved power transfer and higher operational efficiency.

Figure 2A:
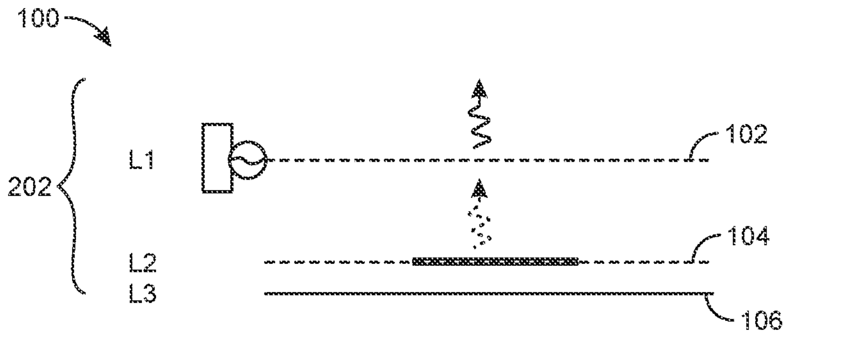
FIGS. 2A-2H illustrate side views of implementations of the transparent combination antenna system.
Figure 2B:
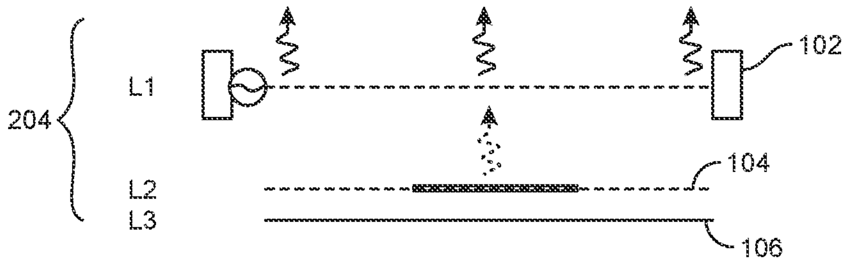
Figure 2C:
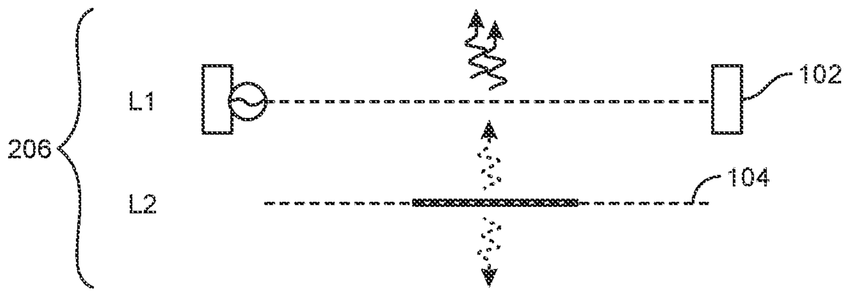
Figure 2D:
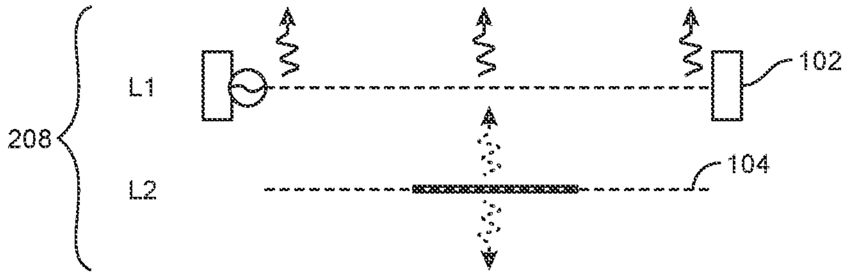
Figure 2E:
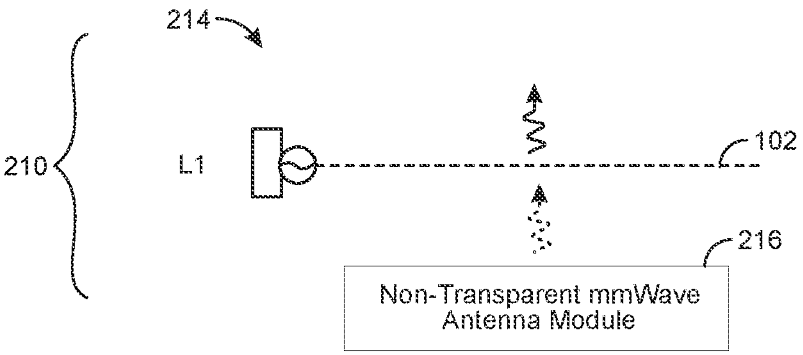
Figure 2F:
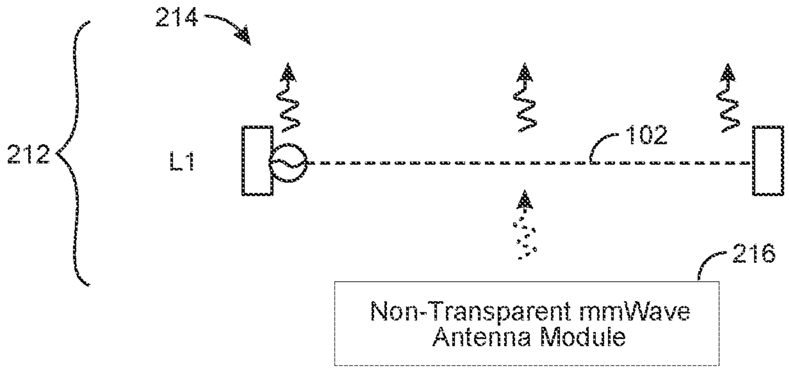

In the side-view of the implementation 206 shown in FIG. 2C, the first transparent antenna layer 102 of the optically transparent antenna 100 can include part of a sub 6 GHz antenna GND, while the second transparent antenna layer 104 can include a free standing mmWave antenna radiator (e.g., such as a dipole antenna). In the side-view of the implementation 208 shown in FIG. 2D, the first transparent antenna layer 102 of the optically transparent antenna 100 can include part of a sub 6 GHz antenna GND, while the second transparent antenna layer 104 can include a free standing mmWave antenna radiator (e.g., such as a dipole antenna). As with the implementation 204, the implementation 208 can include two additional points of radiation at the grounding points.

In some implementations, the second transparent antenna layer 104 may be replaced with a non-transparent mmWave antenna module. For example, in the side-view of the implementation 210 shown in FIG. 2E, a combination antenna 214 can include the first transparent antenna layer 102 including a sub 6 GHz antenna radiator. As further shown in FIG. 2E, the combination antenna 214 can also include a non-transparent mmWave antenna module 216. Similarly, in the side-view of the implementation 212 shown in FIG. 2F, the combination antenna 214 can include the first transparent antenna layer 102 including part of a sub 6 GHz antenna GND and the non-transparent mmWave antenna module 216. In the implementations 210 and 212, the non-transparent mmWave antenna module 216 may include a mmWave antenna and GND. The combination antenna 214 illustrated in FIGS. 2E and 2F may be useful when placed in areas of a device where transparency is not necessary.

The implementations 202-212 discussed above in connection with FIGS. 2A-2F may utilize different mesh configurations between the layers of each implementation. For example, a sub 6 GHz antenna radiator layered on top of a mmWave antenna may have a coarser mesh configuration in order to accommodate the wavelength radiated by the mmWave antenna below. Thus, in some implementations, it may be desirable for a transparent combination antenna to have layers that include the same mesh configurations.

Figure 2G:
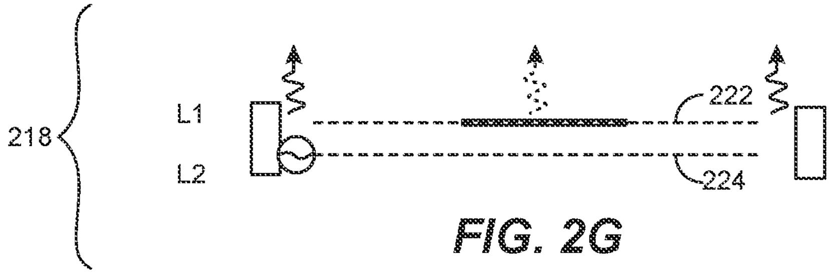
Figure 2H:
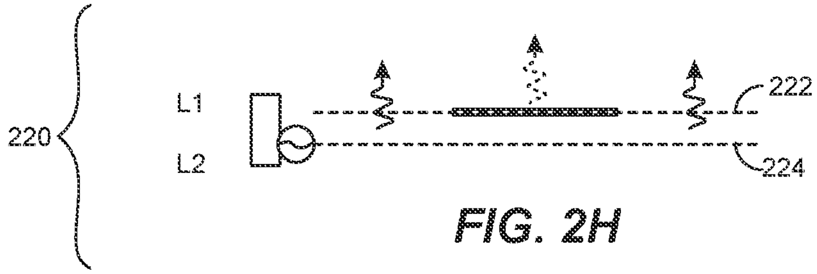

Accordingly, as shown in FIGS. 2G and 2H, the implementations 218 and 220 include a mmWave antenna radiator in a first layer 222. In the implementation 218 shown in FIG. 2G, a second layer 224 can include an aperture antenna ground or signal return path for lower frequency antennas (e.g., normally operating under 10 GHz) as well as a mmWave antenna ground or reflector. In the implementation 220 shown in FIG. 2H, the second layer 224 can include an antenna radiator for lower frequencies (e.g., normally operating under 10 GHz) and a mmWave antenna ground/reflector. As mentioned above, both the first layer 222 and the second layer 224 can have the same metal mesh configuration (e.g., same mesh width and pitch). Alternatively, the first layer 222 and the second layer 224 may have different metal mesh configurations.

Figure 3:
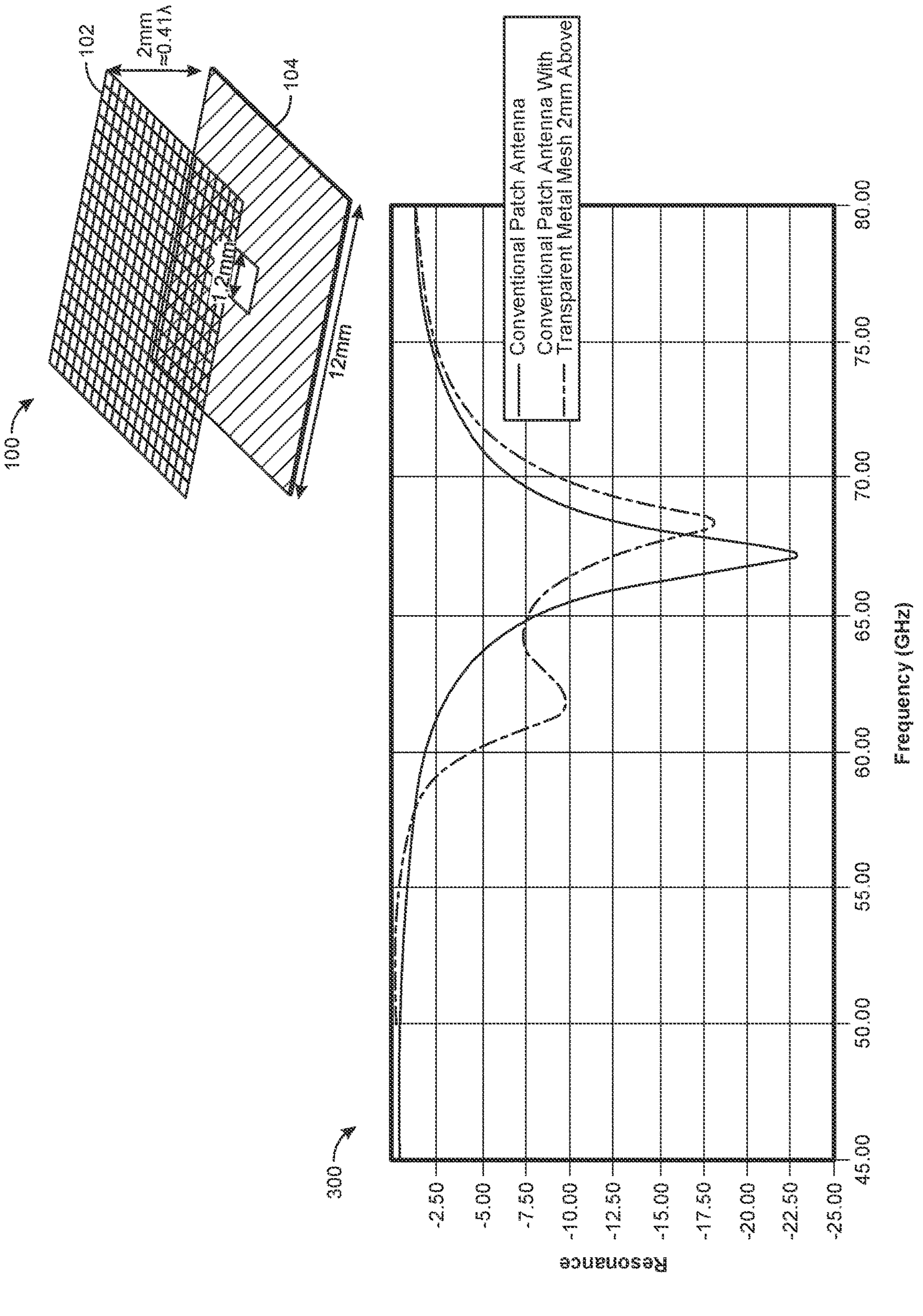
FIG. 3 illustrates a graph comparing resonance across various frequencies of the transparent combination antenna system versus standard transparent antenna systems.

As mentioned above, the optically transparent antenna 100 that includes multiple layers can outperform conventional patch antennas. For example, as shown in FIG. 3, the second transparent antenna layer 104 of the optically transparent antenna 100 can include a 60 GHz patch antenna and the first transparent antenna layer 102 of the optically transparent antenna 100 can include a transparent mesh layer with a 400 μm pitch that is positioned 2 mm above the second transparent antenna layer 104. As shown by the results chart 300, and when compared against the performance of a conventional patch antenna, the conventional patch antenna's resonance around 67 GHz shifts lower to 62 GHz for the optically transparent antenna 100, with additional resonances that appear at 68 GHz.

Figure 4A:
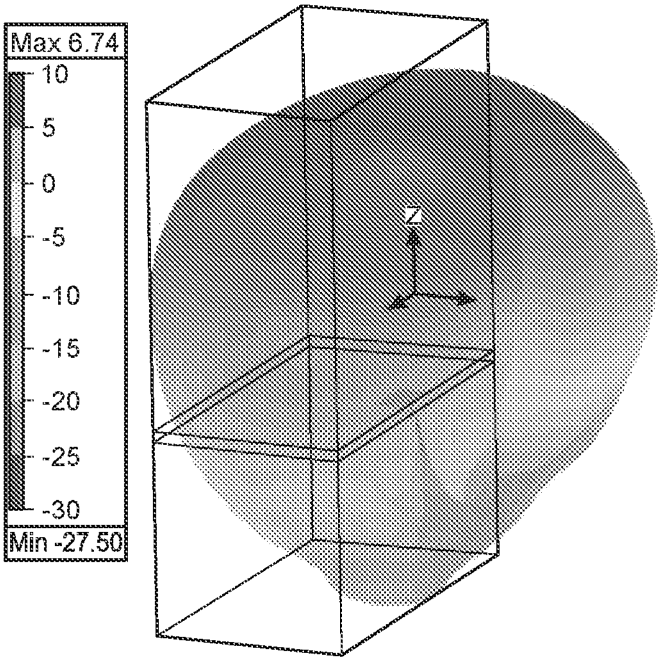
FIGS. 4A and 4B illustrate peak gain improvements of the transparent combination antenna system.
Figure 4B:
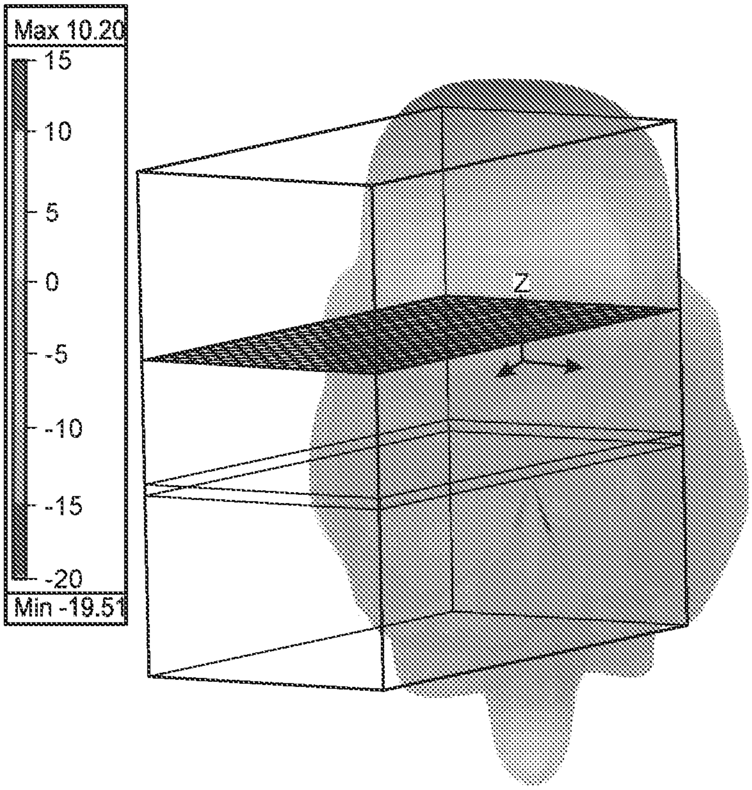

Moreover, as shown in FIGS. 4A and 4B, the optically transparent antenna 100 can improve peak gains of conventional patch antenna at lower frequencies. For example, as shown in FIG. 4A, a conventional patch antenna can experience a peak gain of 6.7 dBi at 66 GHz. As shown in FIG. 4B, the optically transparent antenna 100 that includes the conventional patch antenna with transparent metal mesh positioned (e.g., 2 mm) above the conventional patch antenna can experience a peak gain of 10.2 dBi at 62 GHz. As such, with the transparent metal mesh positioned on top of the patch antenna, not only can the mmWave radio wave be radiated through the coarser transparent metal layer (e.g., the first transparent antenna layer 102) which is used for lower frequency antennas, it also enhances the gain at boresight direction (e.g., a direction along an axis of symmetry of the optically transparent antenna 100).

Figure 4C:
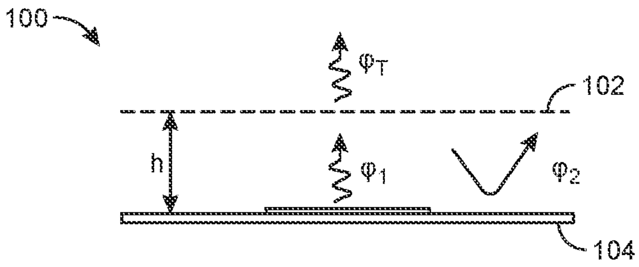
FIG. 4C illustrates a side view of an implementation of the transparent combination antenna system.

For example, as demonstrated by FIG. 4C, when the separation h between the first transparent antenna layer 102 (e.g., a sub 6 GHz antenna mesh) and the second transparent antenna layer 104 (e.g., a mmWave mesh) is around $0.5\lambda_{mmWave}$, the wave radiated from the mmWave antenna $\varphi_1$ and the reflected wave $\varphi_2$ can add up in phase.

In at least one implementation, a system may be provided. The system may include a bottom layer of transparent conductive material (e.g., the second transparent antenna layer 104) having a specified pitch. The system may also include a first antenna feed electrically connected to the bottom layer of transparent conductive material. A nonconductive substrate (e.g., plastic or glass) may be placed on the bottom layer of transparent conductive material (e.g., transparent metal mesh). A different layer of transparent conductive material (e.g., the first transparent antenna layer 102) may be positioned on top of the substrate. This top layer may have a different pitch than the bottom layer. A second antenna feed may be electrically connected to the top layer of transparent conductive material. As such, each of the two layers of transparent conductive material may have its own antenna feed to drive each of the two antennas at different frequencies.

In some cases, the bottom layer of transparent conductive material, the substrate, and the top layer of transparent conductive material may be disposed on a lens. This lens may be integrated into and may be part of a pair of augmented reality (AR) glasses. Additionally or alternatively, the bottom layer of transparent conductive material, the intermediate substrate layer, and the top layer of transparent conductive material may be disposed on a touchscreen. This touchscreen may be integrated into and may be part of a smartwatch, smartphone, or any other electronic device having smart glass. The top layer of transparent conductive material may operate as a transparent antenna that is configured to operate at frequencies between 100 MHz-10 GHz. Such frequencies may allow wireless communication in various bands including WiFi 6E, global positioning system (GPS), 3G, 4G, or 5G. The bottom layer of transparent conductive material may operate as a transparent antenna that is configured to operate between 24 GHz-62+GHz. Such frequencies may allow wireless communication for radar sensing or ranging or may allow 5G FR2 or line-of-sight communication.

In some cases, the thickness of the substrate between the bottom layer of transparent conductive material and the top layer of transparent conductive material may be relationally determined based on the wavelength of electromagnetic waves radiated from the bottom layer of transparent conductive material. For instance, the thickness of the substrate between the bottom layer of transparent conductive material and top layer of transparent conductive material may be between 0.4-0.6× the wavelength of the electromagnetic waves radiated from the bottom layer of transparent conductive material, and in one specific example, may be 0.5× the electromagnetic waves radiated from the bottom layer of transparent conductive material.

The top layer of transparent conductive material may, at least in some cases, reflect at least a portion of electromagnetic waves radiated by the bottom layer of transparent conductive material. Because the thickness of the substrate is related to the wavelength of the bottom layer of transparent conductive material, at least some of the reflections may be in phase and may be additive. This may enhance the radiating efficiency of the bottom layer of transparent conductive material. In cases where the reflections are at least partially destructive, the bottom antenna feed may be tuned to a different frequency. This different frequency may ensure that most or all of the electromagnetic waves reflected by the top layer of transparent conductive material are in phase and are additive to the electromagnetic waves radiated by the bottom layer of transparent conductive material.

As mentioned above, FIG. 5 is a flow diagram of an exemplary method 500 for generating, manufacturing, or otherwise creating a transparent combination antenna. In at least one example, each of the steps shown in FIG. 5 may represent an algorithm whose structure includes and/or is represented by multiple sub-steps, examples of which will be provided in greater detail below.

Figure 5:
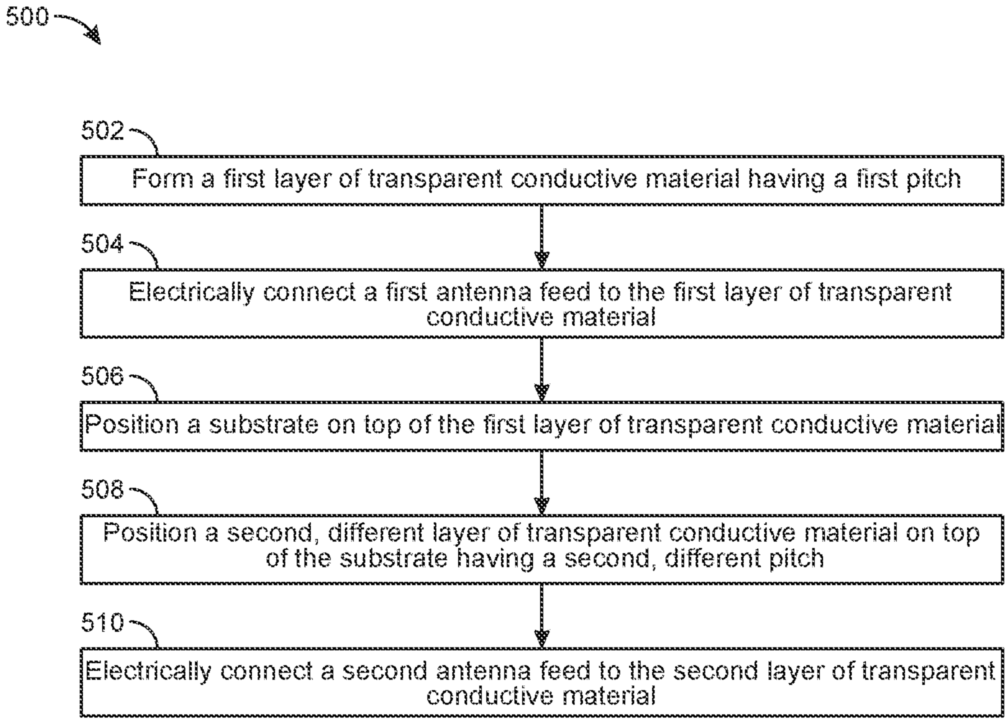
FIG. 5 illustrates a flow diagram of steps taken in a method of manufacturing the transparent combination antenna system.

As illustrated in FIG. 5, at step 502 the method for generating the transparent combination antenna can form a first layer of transparent conductive material having a first pitch. For example, as discussed above, the first layer of transparent conductive material can be metal mesh that performs as a mmWave antenna. In one or more implementations, the metal mesh of the first layer of transparent conductive material can have a smaller pitch than any other layer in the transparent combination antenna.

Additionally, at step 504 the method can electrically connect a first antenna feed to the first layer of transparent conductive material. For example, the first antenna feed can provide electronic signals to the first layer of transparent conductive material that enables that layer to perform as a mmWave antenna.

At step 506 the method can position a substrate on top of the first layer of transparent conductive material. For example, the substrate can include a layer of material that enables electromagnetic waves to radiate from the first layer of transparent conductive material to other layers of the transparent combination antenna.

Furthermore, at step 508 the method can position a second, different layer of transparent conductive material on top of the substrate having a second, different pitch. For example, as discussed above, the second layer of transparent conductive material can be metal mesh that performs as a sub 6 GHz antenna radiator. In one or more implementations, the metal mesh of the second layer of transparent conductive material can have a larger pitch than the first layer of the transparent combination antenna.

Moreover, at step 510 the method can electrically connect a second antenna feed to the second layer of transparent conductive material. As with the first antenna feed, the second antenna feed can provide electronic signals to the second layer of transparent conductive material that enables that layer to perform as a sub 6 GHz antenna.

As such, the transparent combination antenna system (e.g., optically transparent antenna 100) described herein overcomes many of the challenges and deficiencies found in existing antenna systems. For example, the described transparent combination antenna system expands existing antenna systems to both the sub 6 GHz and the above 24 GHz spectra thereby providing a wide amount of bandwidth. This amount of bandwidth enables high data rates and capacity. Moreover, the transparent combination antenna system provides these benefits with an extremely small footprint. Additionally, because the transparent combination antenna system is optically clear (in addition to being extremely compact), it is an ideal addition to glass lenses such as those used in augmented and virtual reality devices.

EXAMPLE IMPLEMENTATIONS

Example 1: A system for providing a transparent combination antenna for providing both sub 6 GHz and the above 24 GHz bandwidth. For example, the system may include a first layer of transparent conductive material having a first pitch, and a first antenna feed electrically connected to the first layer of transparent conductive material. The system may further include a substrate positioned on top of the first layer of transparent conductive material, a second, different layer of transparent conductive material positioned on top of the substrate having a second, different pitch, and a second antenna feed electrically connected to the second layer of transparent conductive material.

Example 2: The system of Example 1, wherein the first layer of transparent conductive material, the substrate, and the second layer of transparent conductive material are disposed on a lens or on smart glass.

Example 3: The system of any of Examples 1 and 2, wherein the lens is integrated into a pair of augmented reality glasses.

Example 4: The system of any of Examples 1-3, wherein the first layer of transparent conductive material, the substrate, and the second layer of transparent conductive material are disposed on a touchscreen.

Example 5: The system of any of Examples 1-4, wherein the touchscreen is integrated into at least one of a smartwatch or a smartphone.

Example 6: The system of any of Examples 1-5, wherein the first layer of transparent conductive material comprises a transparent antenna configured to operate between 100 MHz-10 GHz.

Example 7: The system of any of Examples 1-6, wherein the second layer of transparent conductive material comprises a transparent antenna configured to operate at frequencies 24 GHz or higher.

Example 8: The system of any of Examples 1-7, wherein at least one of the first layer of transparent conductive material or the second layer of transparent conductive material comprises a transparent antenna including at least one of a monopole antenna, a dipole antenna, a loop antenna, or a slot antenna.

Example 9: The system of any of Examples 1-8, wherein the first pitch of the first layer of transparent conductive material is finer than the second pitch of the second layer of transparent conductive material.

Example 10: The system of any of Examples 1-9, wherein electromagnetic waves radiated by the first layer of transparent conductive material are configured to penetrate through the second layer of transparent conductive material.

Example 11: The system of any of Examples 1-10, wherein a thickness of the substrate is relationally determined based on a wavelength of electromagnetic waves radiated from the first layer of transparent conductive material.

Example 12: The system of any of Examples 1-11, wherein the second layer of transparent conductive material reflects at least a portion of electromagnetic waves radiated by the first layer of transparent conductive material, and wherein at least a portion of the reflections are additive.

Example 13: The system of any of Examples 1-12, wherein the second antenna feed is tuned to a different frequency upon determining that at least a portion of the electromagnetic waves radiated by the first layer of transparent conductive material are destructive.

In some examples, an optically transparent antenna can provide both sub 6 GHz and the above 24 GHz bandwidth. For example, the optically transparent antenna can include a first layer of transparent conductive material having a first pitch, a first antenna feed electrically connected to the first layer of transparent conductive material, a substrate positioned on top of the first layer of transparent conductive material, a second, different layer of transparent conductive material positioned on top of the substrate having a second, different pitch, and a second antenna feed electrically connected to the second layer of transparent conductive material.

Additionally in some examples, a method for generating an optically transparent antenna can include forming a first layer of transparent conductive material having a first mesh configuration, electrically connecting a first antenna feed to the first layer of transparent conductive material, positioning a substrate on top of the first layer of transparent conductive material, positioning a second, different layer of transparent conductive material on top of the substrate having the first mesh configuration, and electrically connecting a second antenna feed to the second layer of transparent conductive material.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
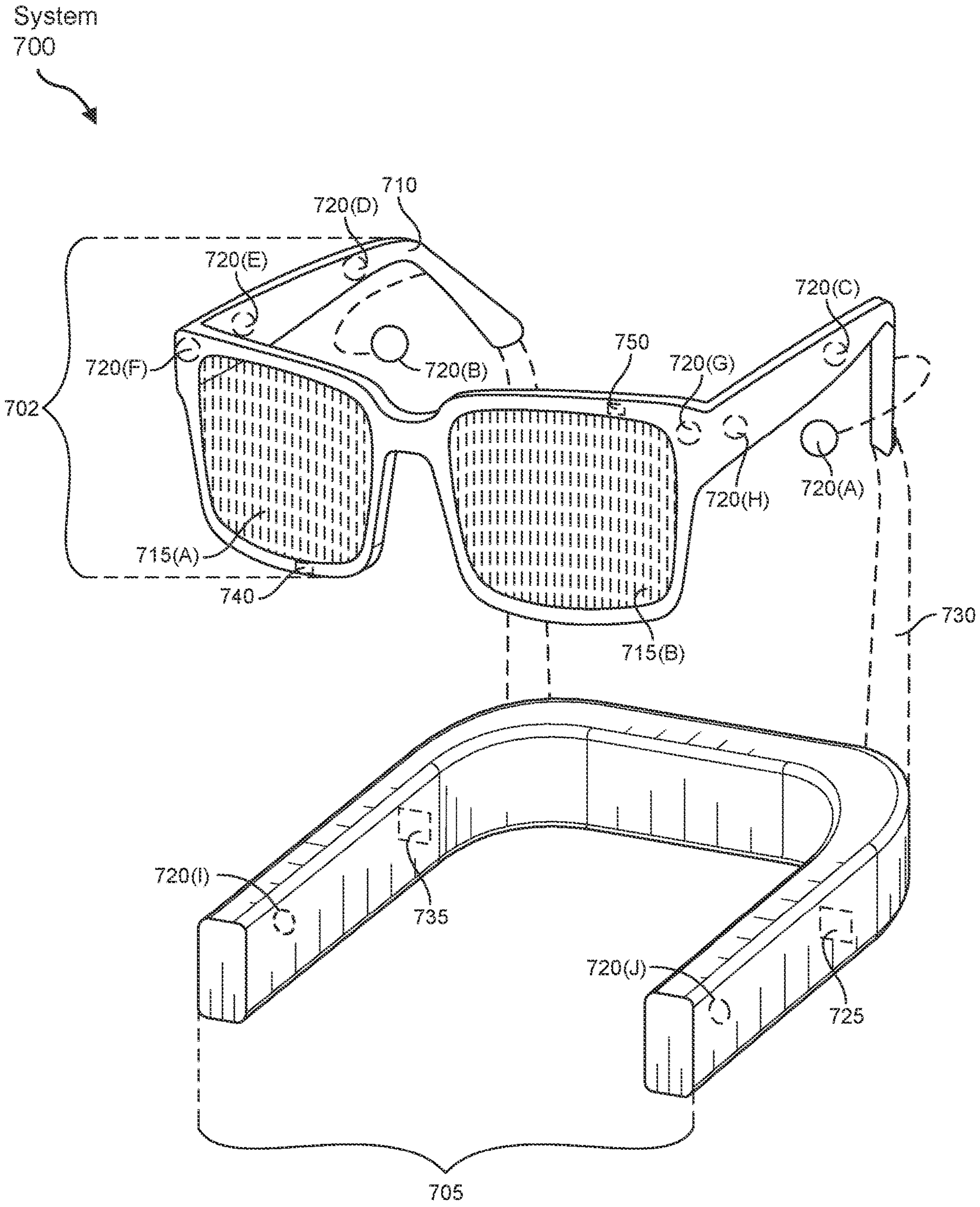
FIG. 6 illustrates exemplary augmented-reality glasses that may be used in connection with implementations of this disclosure.
Figure 7:
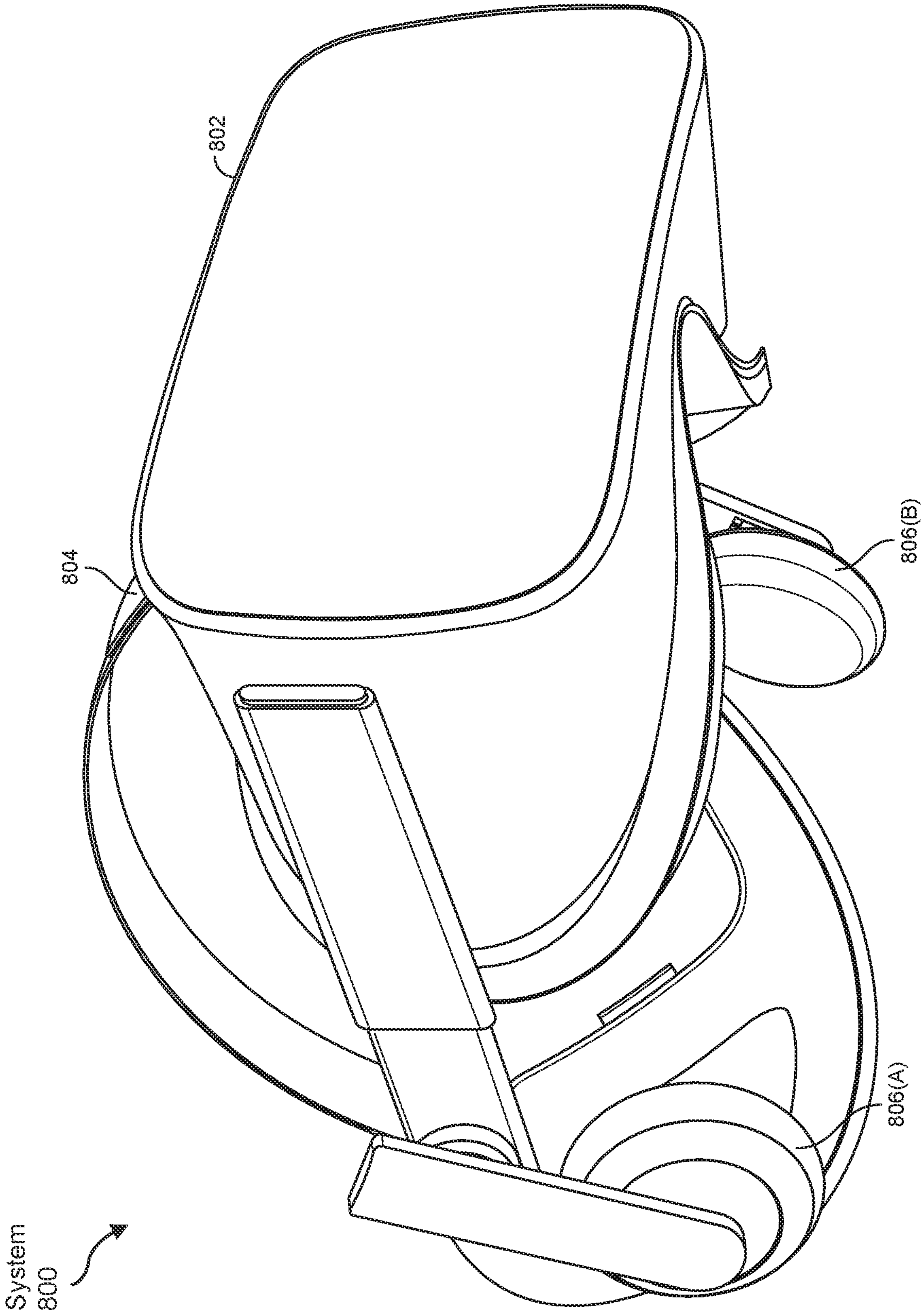
FIG. 7 illustrates an exemplary virtual-reality headset that may be user in connection with implementations of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620 (D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium-ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a first layer of transparent conductive material having a first pitch;

a first antenna feed electrically connected to the first layer of transparent conductive material;

a substrate positioned on top of the first layer of transparent conductive material;

a second, different layer of transparent conductive material positioned on top of the substrate having a second, different pitch; and a second antenna feed electrically connected to the second layer of transparent conductive material.

2. The system of claim 1, wherein the first layer of transparent conductive material, the substrate, and the second layer of transparent conductive material are disposed on a lens or on smart glass.

3. The system of claim 2, wherein the lens is integrated into a pair of augmented reality glasses.

4. The system of claim 1, wherein the first layer of transparent conductive material, the substrate, and the second layer of transparent conductive material are disposed on a touchscreen.

5. The system of claim 4, wherein the touchscreen is integrated into at least one of a smartwatch or a smartphone.

6. The system of claim 1, wherein the first layer of transparent conductive material comprises a transparent antenna configured to operate between 100 MHz-10 GHz.

7. The system of claim 1, wherein the second layer of transparent conductive material comprises a transparent antenna configured to operate at frequencies 24 GHz or higher.

8. The system of claim 1, wherein at least one of the first layer of transparent conductive material or the second layer of transparent conductive material comprises a transparent antenna including at least one of a monopole antenna, a dipole antenna, a loop antenna, or a slot antenna.

9. The system of claim 1, wherein the first pitch of the first layer of transparent conductive material is finer than the second pitch of the second layer of transparent conductive material.

10. The system of claim 1, wherein electromagnetic waves radiated by the first layer of transparent conductive material are configured to penetrate through the second layer of transparent conductive material.

11. The system of claim 1, wherein a thickness of the substrate is relationally determined based on a wavelength of electromagnetic waves radiated from the first layer of transparent conductive material.

12. The system of claim 11, wherein the second layer of transparent conductive material reflects at least a portion of electromagnetic waves radiated by the first layer of transparent conductive material, and wherein at least a portion of the reflections are additive.

13. The system of claim 12, wherein the second antenna feed is tuned to a different frequency upon determining that at least a portion of the electromagnetic waves radiated by the first layer of transparent conductive material are destructive.

14. An optically transparent antenna comprising:

a first layer of transparent conductive material having a first pitch;

a first antenna feed electrically connected to the first layer of transparent conductive material;

a substrate positioned on top of the first layer of transparent conductive material;

a second, different layer of transparent conductive material positioned on top of the substrate having a second, different pitch; and a second antenna feed electrically connected to the second layer of transparent conductive material.

15. The optically transparent antenna of claim 14, wherein the first layer of transparent conductive material, the substrate, and the second layer of transparent conductive material are disposed on a lens or on smart glass.

16. The optically transparent antenna of claim 15, wherein the lens is integrated into a pair of augmented reality glasses.

17. The optically transparent antenna of claim 14, wherein the first layer of transparent conductive material, the substrate, and the second layer of transparent conductive material are disposed on a touchscreen.

18. The optically transparent antenna of claim 17, wherein the touchscreen is integrated into at least one of a smartwatch or a smartphone.

19. The optically transparent antenna of claim 14, wherein the first layer of transparent conductive material comprises a transparent antenna configured to operate between 100 MHz-10 GHz.

20. A method comprising:

forming a first layer of transparent conductive material having a first mesh configuration;

electrically connecting a first antenna feed to the first layer of transparent conductive material;

positioning a substrate on top of the first layer of transparent conductive material;

positioning a second, different layer of transparent conductive material on top of the substrate having the first mesh configuration; and electrically connecting a second antenna feed to the second layer of transparent conductive material.

* * * * *